(12) United States Patent
Akselrod et al.

(10) Patent No.: US 12,529,807 B2
(45) Date of Patent: Jan. 20, 2026

(54) DIGITAL NEUTRON DOSIMETER BASED ON 3D NAND FLASH MEMORY

(71) Applicant: Landauer, Inc., Glenwood, IL (US)

(72) Inventors: Mark Samuilovich Akselrod, Aurora, CO (US); Vasiliy Vasilyevich Fomenko, Stillwater, OK (US); Jonathan Mitchell Harrison, Stillwater, OK (US)

(73) Assignee: Landauer, Inc., Glenwood, IL (US)

( * ) Notice: Subject to any disclaimer, the term of this patent is extended or adjusted under 35 U.S.C. 154(b) by 232 days.

(21) Appl. No.: 18/338,924

(22) Filed: Jun. 21, 2023

(65) Prior Publication Data
US 2023/0408715 A1 Dec. 21, 2023

Related U.S. Application Data

(60) Provisional application No. 63/354,161, filed on Jun. 21, 2022.

(51) Int. Cl.
*G01T 5/00* (2006.01)
*G01T 3/00* (2006.01)
*G11C 16/04* (2006.01)

(52) U.S. Cl.
CPC ............... *G01T 5/00* (2013.01); *G01T 3/00* (2013.01); *G11C 16/0483* (2013.01)

(58) Field of Classification Search
CPC .. G01T 5/00; G01T 3/00; G01T 1/245; G11C 16/0483; G11C 5/005; G11C 16/344; G11C 29/08; G11C 16/3454
See application file for complete search history.

(56) References Cited

U.S. PATENT DOCUMENTS

| | | | |
|---|---|---|---|
| 10,878,922 B1 * | 12/2020 | Ray | G11C 5/005 |
| 11,354,134 B1 * | 6/2022 | Yudanov | G11C 7/1006 |
| 11,355,170 B1 * | 6/2022 | Yudanov | G11C 8/06 |
| 2010/0140488 A1 * | 6/2010 | Visconti | G01T 1/026 |
| | | | 250/370.07 |

(Continued)

OTHER PUBLICATIONS

International Search Report and Written Opinion issued in International Patent Application No. PCT/US2023/068834 mailed Sep. 18, 2023 (18 pages).

(Continued)

*Primary Examiner* — David P Porta
*Assistant Examiner* — Gisselle M Gutierrez
(74) *Attorney, Agent, or Firm* — Seed Intellectual Property Law Group LLP

(57) ABSTRACT

A digital neutron and photon track dosimeter based on three-dimensional Not-And (3D NAND) flash memory may be provided. A plurality of logical addresses respectively associated with a plurality of cells in a 3D NAND flash memory that have been flipped from a first charge state to a second charge state may be determined. Next, the plurality of logical addresses may be converted to a plurality of physical addresses associated with the plurality of cells in the 3D NAND flash memory that have been flipped from the first charge state to the second charge state by radiation. Then a radiation dose proportional to number and plurality of tracks within the plurality of cells associated with the plurality of physical address may be determined.

20 Claims, 8 Drawing Sheets

(56) References Cited

U.S. PATENT DOCUMENTS

| | | | | |
|---|---|---|---|---|
| 2013/0107628 A1* | 5/2013 | Dong | ................... | G11C 16/14 |
| | | | | 365/185.17 |
| 2016/0141041 A1* | 5/2016 | Yang | ................. | G11C 11/5635 |
| | | | | 365/185.11 |
| 2016/0187497 A1 | 6/2016 | Lerche et al. | | |
| 2018/0149762 A1 | 5/2018 | Akselrod et al. | | |
| 2020/0388628 A1* | 12/2020 | Li | .......................... | H10B 43/27 |
| 2022/0019442 A1* | 1/2022 | Yudanov | ............. | G06F 15/8046 |
| 2023/0060583 A1* | 3/2023 | Sanuki | ................... | H10B 80/00 |
| 2023/0410898 A1* | 12/2023 | Kellam | .................. | G11C 16/14 |
| 2024/0221814 A1* | 7/2024 | Wang | ...................... | G11C 5/02 |

OTHER PUBLICATIONS

Anonymous: "Flash Memory—Wikipedia"; May 1, 2022, pp. 1-32, Retrieved from the Internet: URL:https://en.wikipedia.org/w/index.php?title=Flash_memory&oldid=1085657520 [retieved on Sep. 8, 2023] p. 7.

* cited by examiner

DIGITAL NEUTRON DOSIMETER BASED ON 3D NAND FLASH MEMORY

Under provisions of 35 U.S.C. § 119(e), Applicant claims the benefit of U.S. Provisional Application No. 63/354,161 filed Jun. 21, 2022, which is incorporated herein by reference.

RELATED APPLICATION TECHNICAL FIELD

Technical Field

The present disclosure relates generally to a digital neutron dosimeter based on three dimensional Not-And (NAND) flash memory.

Background

A radiation dosimeter is a device that measures dose uptake of external ionizing radiation. It is worn by the person being monitored when used as a personal dosimeter, and a legal radiation dose of record is obtained. Modern electronic personal dosimeters (EPD) may give a continuous readout of cumulative dose and current dose rate, and may warn the wearer with an audible alarm when a specified dose rate or a cumulative dose is exceeding a preset threshold. Other dosimeters, such as thermoluminescent (TL) or optically stimulated luminescent (OSL) types, may require processing after use to reveal the cumulative dose received, and may not give a current indication of dose while being worn.

An electronic personal dosimeter, is an electronic device that has a number of functions, such as continual monitoring, which allows alarm warnings at pre-set levels and live readout of dose accumulated. These are especially useful in high dose areas where residence time of the wearer is limited due to dose constraints. The dosimeter may be reset, usually after taking a reading for record purposes, and thereby re-used multiple times. Their main disadvantage is constant reliance on battery power and potential loss of dose information if the battery dies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
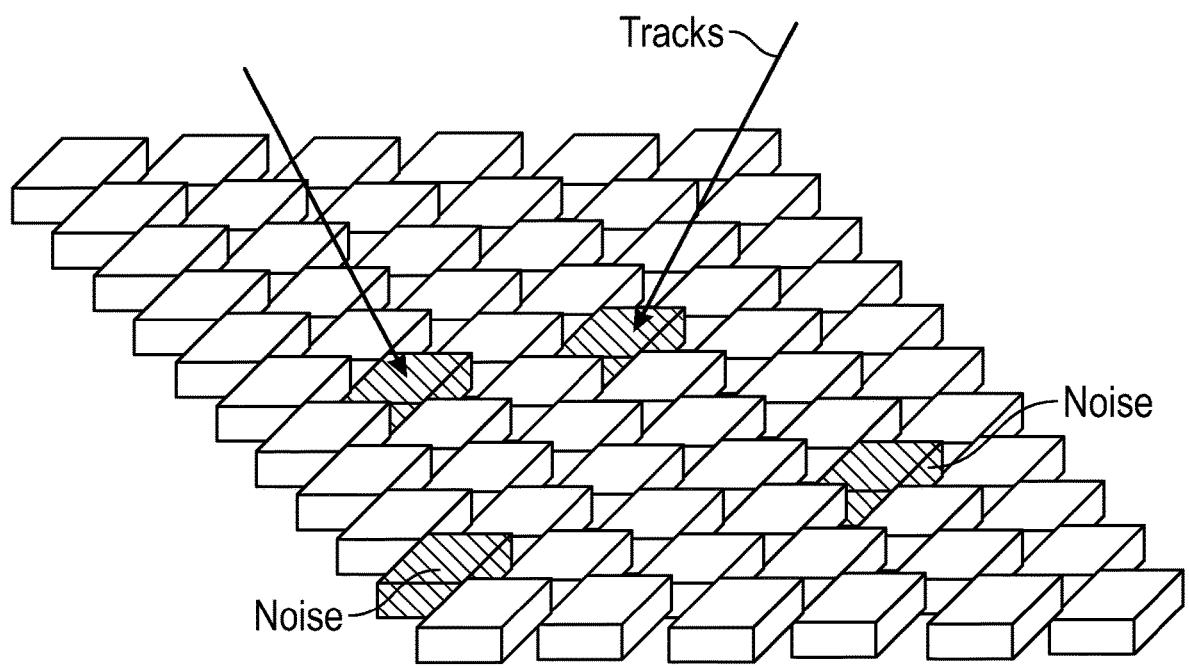
FIG. 1 illustrates a two dimensional (2D) memory structure with charge particles related flips and readout noise flips which are difficult to discriminate.

A digital neutron dosimeter based on three dimensional Not-And (NAND) flash memory may be provided. A plurality of logical addresses respectively associated with a plurality of cells in a three-dimensional (3D) NAND flash memory that have been flipped from a first charge state to a second charge state may be determined. Next, the plurality of logical addresses may be converted to a plurality of physical addresses associated with the plurality of cells in the 3D NAND flash memory that have been flipped from the first charge state to the second charge state by radiation or readout instability (noise). Then a plurality of tracks within the plurality of cells, defined as correlated clusters of cells, associated with the plurality of physical address may be determined.

Both the foregoing overview and the following example embodiments are examples and explanatory only and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

EXAMPLE EMBODIMENTS

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Embodiments of the disclosure may provide a method and a system used in a high fidelity wireless digital neutron dosimeter based on a three-dimensional (3D) NAND flash memory (i.e., a 3D Electronic Track Detector (3DETD)). This may be based on a nuclear track detector concept, when radiation may create so-called "tracks" in the 3D volume of the sensitive media. These radiation-induced "tracks" may be identified, discriminated, and counted on the background of readout noise, while the number of tracks may be proportional to the dose accumulated by the dosimeter.

One advantage of embodiments of the disclosure may be that the accumulation of dose information in the volume of the dosimeter sensor may be provided without the need of electrical power (i.e., been a passive integrating sensor), while readout and streaming the useful data may use electrical (e.g., battery) power. In contrast, conventional active neutron dosimeters require electrical power to operate.

Conventional passive nuclear track dosimeters, like Plastic Nuclear Track Detectors (PNTD) and Fluorescent Nuclear Track Detectors (FNTD), may have sensitivity and performance for neutron detection, but they may not be processed in the field and may require laboratory processing with expensive readers. Embodiments of the disclosure may combine the fidelity of the passive integrating track detector with the ability to measure/read the dose on-demand or at required time intervals with wireless transmission of the data to the base station and the cloud for final processing.

In contrast with conventional "active" dosimeters that may detect each event of radiation interaction and require constant application of electrical voltage, "passive" sensors may not stop accumulating the dose information in case of battery power loss. Embodiments of the disclosure may include utilization of existing and robust 3D NAND technology for a volumetric 3D radiation track detector, combined with the selection of an optimal threshold voltage to read 3D NAND chips. Furthermore, embodiments of the disclosure may provide the ability to identify and discriminate individual radiation-induced tracks on the background of readout noise using a clustering algorithm and machine learning/deep learning tools for example.

Embodiments of the disclosure may be based on a binary concept: if you have a track it is 1, if you don't it is 0. As a result the dosimeter may be immune to fluctuations in sensor sensitivity due to manufacturing variations and external environmental factors like temperature, humidity, battery voltage, and Electromagnetic Interference (EMI). This may be in contrast with conventional analog sensor technologies like Metal-Oxide-Semiconductor Field-Effect Transistors (MOSFET), PiN diodes, or Direct Ion Storage (DIS) sensors that may be sensitive to many of the above environmental factors.

Conventional track detectors may be limited to low dose measurements because, at high doses, tracks in the sensor volume may start to overlap and it may become difficult to identify individual tracks. With embodiments of the disclosure, high doses of radiation may be measured when the number of interactions with the sensor are so large that individual tracks overlap in the sensor volume and other image processing techniques like a Power Spectral Integral (PSI) processing used in FNTD technology are used.

Neutron radiation may produce small numbers of interactions with the sensor and sensors have a large interaction area and volume to achieve required Low Limit of Detection (LLD). As a result, track detectors may have better signal-to-noise ratio (SNR) in comparison with analog sensors and at the same time may have good counting statistics. In addition, using of-the-shelf components (e.g., 3D NAND chips) may make the neutron dosimeter more cost effective consistent with embodiments of the disclosure.

Figure 2:
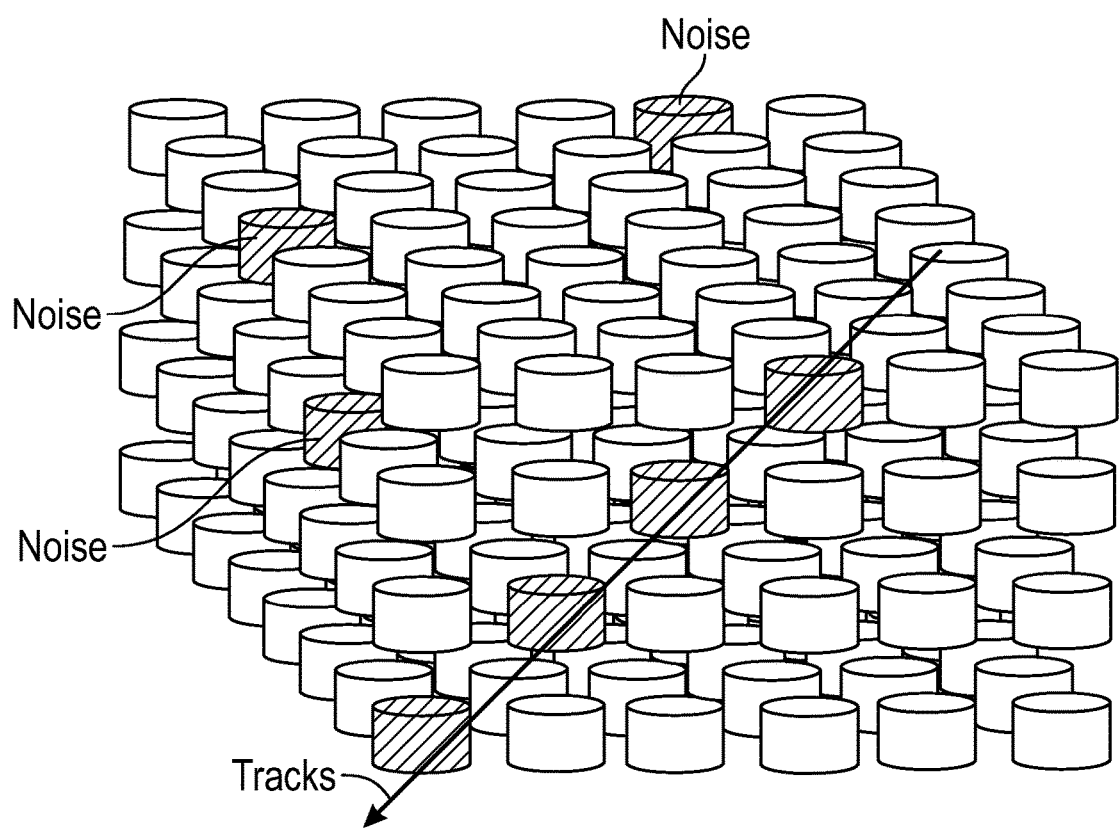
FIG. 2 illustrates a three dimensional (3D) memory structure with charge particle tracks having linear or curved structure, which allows discrimination from readout noise.

FIG. 1 illustrates a two-dimensional (2D) memory structure. As shown in FIG. 1, with the 2D memory structure, there may be no way to distinguish cells effected by radiation from cell experiencing "flips" as a result of readout noise. FIG. 2 illustrates a linear radiation induced track in a 3D NAND memory. The tracks in 3D NAND memory may be discriminated from random readout noise (i.e., individual uncorrelated cell flips).

A 3D NAND flash memory 930, as described in greater detail below with respect to FIG. 9, may comprise a Triple-Level Cell (TLC) flash memory. A TLC flash memory may comprise a type of NAND flash memory that stores three bits of data per cell. A TLC memory may be programmed to eight different charge states. Prior to use, floating gates of the memory cell may be charged to a higher charge state (e.g., a first charge state). Radiation may discharge floating gates in the memory and, at a selected threshold voltage Vth, more cells may appear in a lower charge state (e.g., a second charge state). Embodiments of the disclosure may include the selection of an optimal threshold voltage Vth (e.g., the second charge state) for an optimal number of cells to be processed and analyzed.

Figure 3:
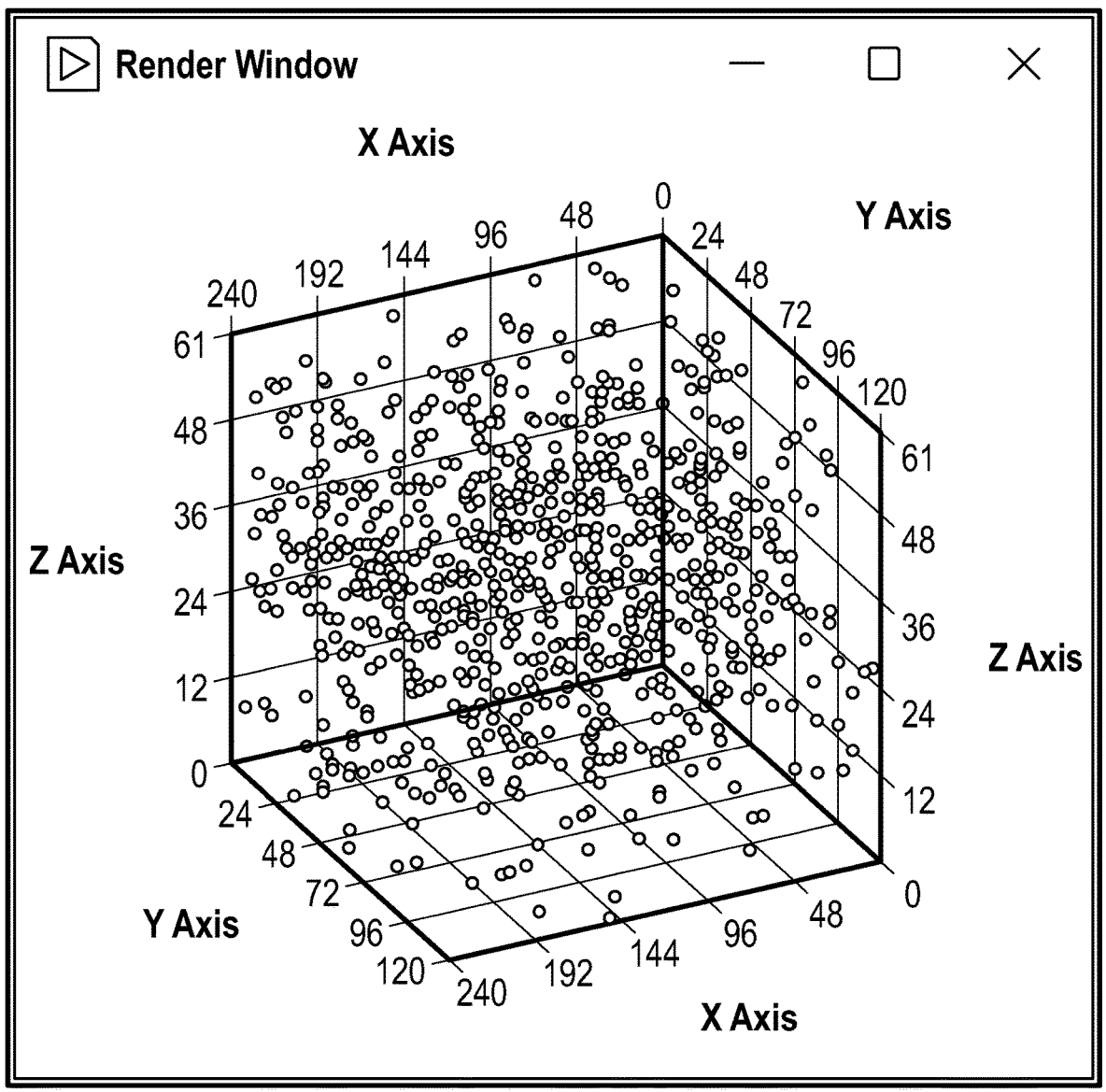
FIG. 3 illustrates a cloud of flipped cells in a selected sub volume of 3D NAND flash memory.
Figure 4:
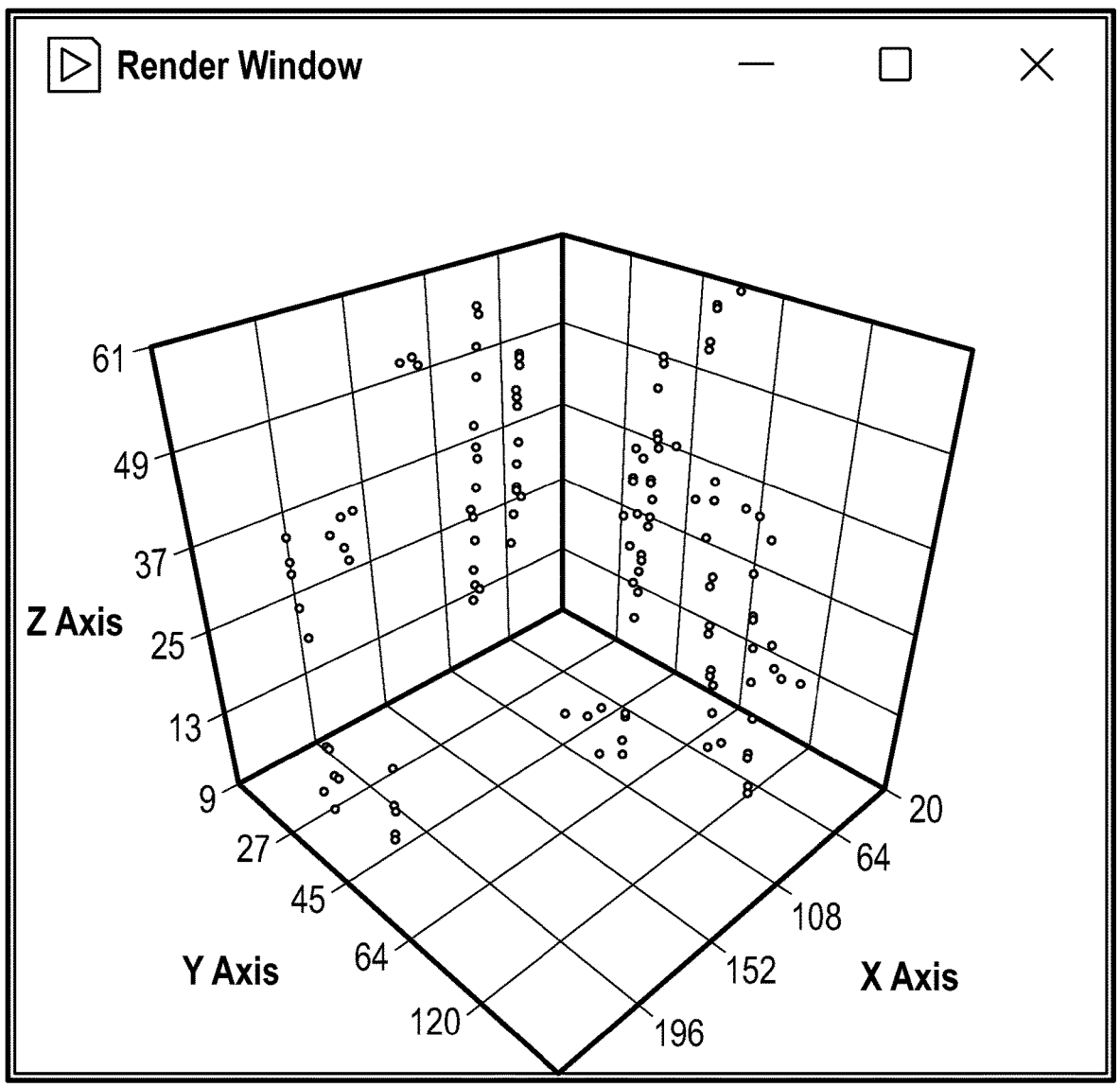
FIG. 4 illustrates charged particle-induced tracks in the small sub-volume of 3D NAND flash memory after discrimination from cloud of noise.
Figure 5:
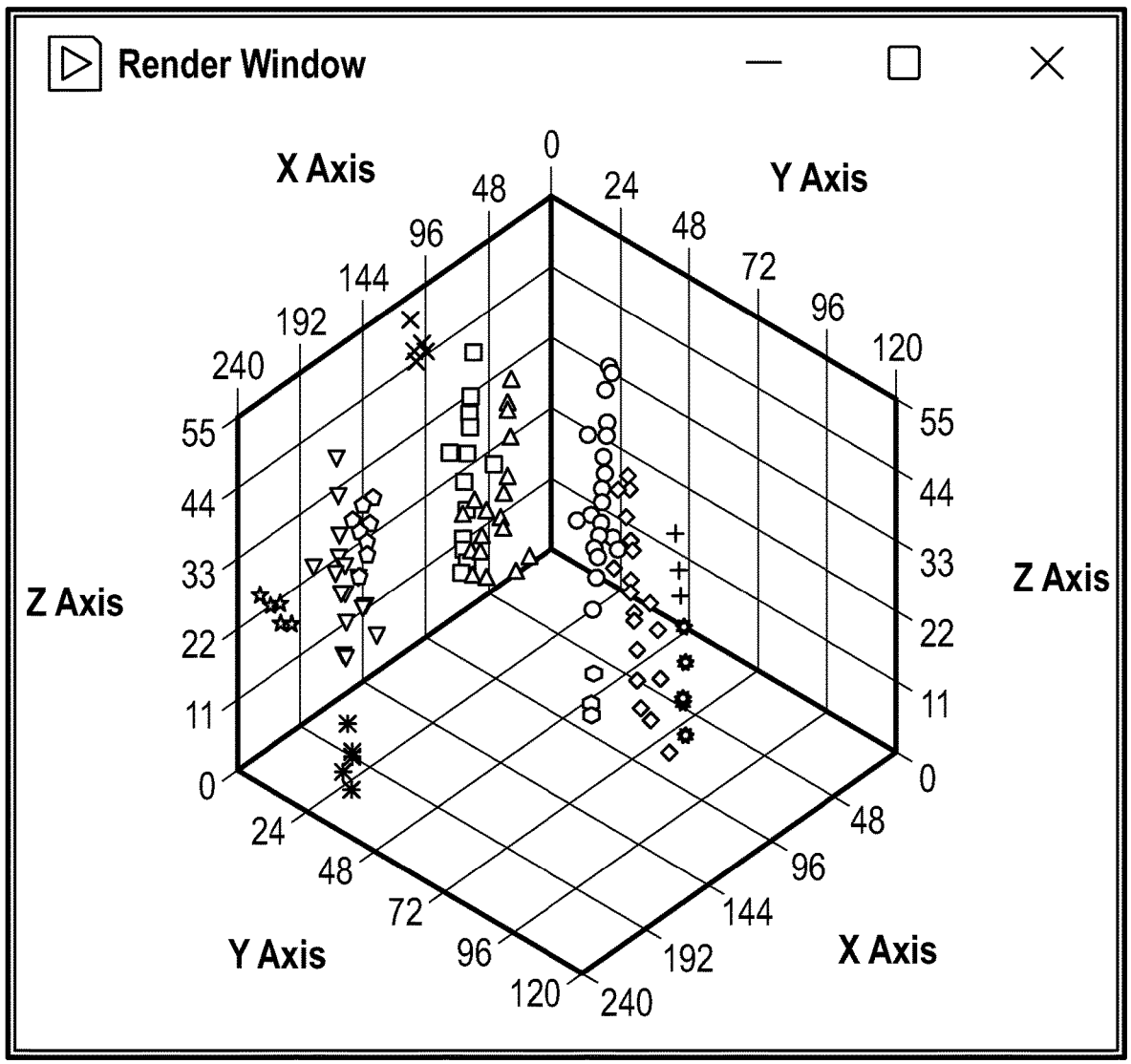
FIG. 5 illustrates tracks visualization after stitching colinear tracks belonging to the same irradiation event.
Figure 6:
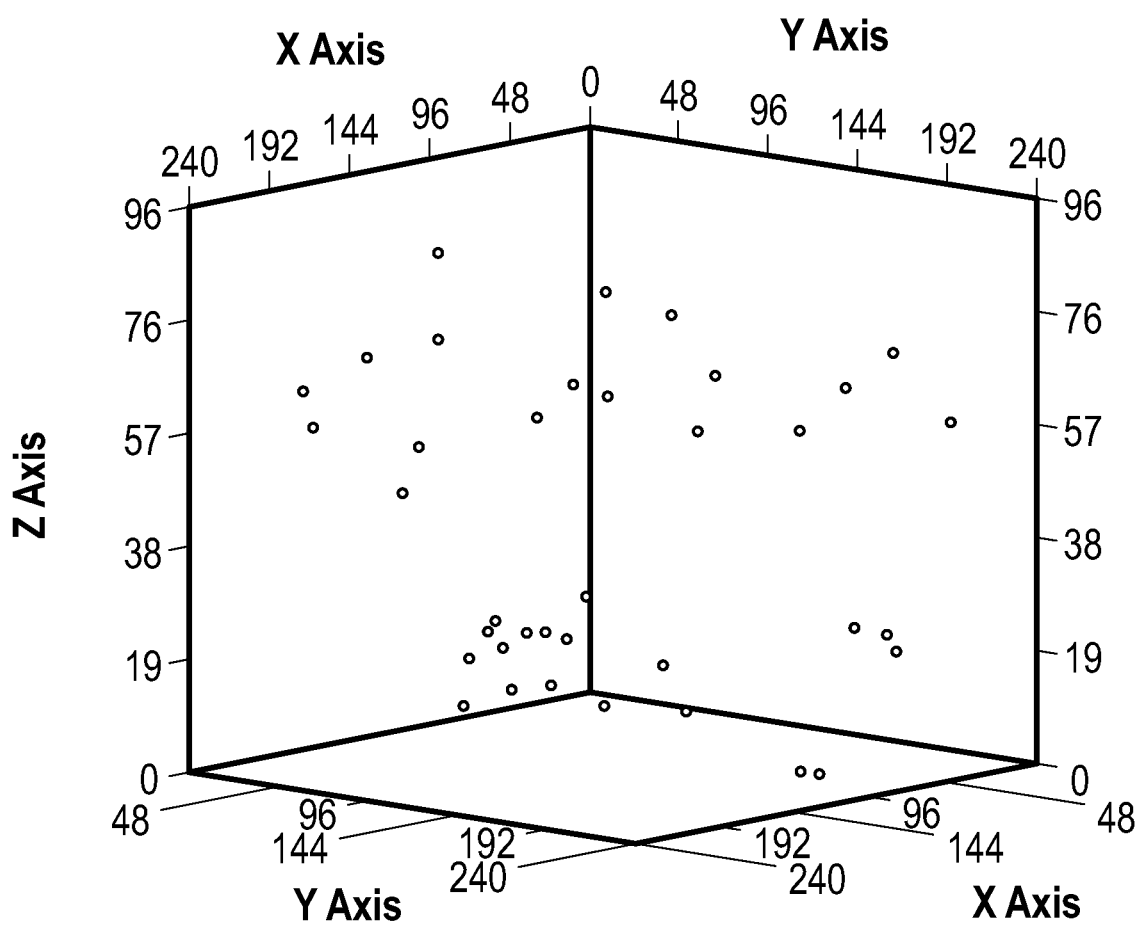
FIG. 6 illustrates a 3D sub-volume of NAND flash memory not been irradiated.
Figure 7:
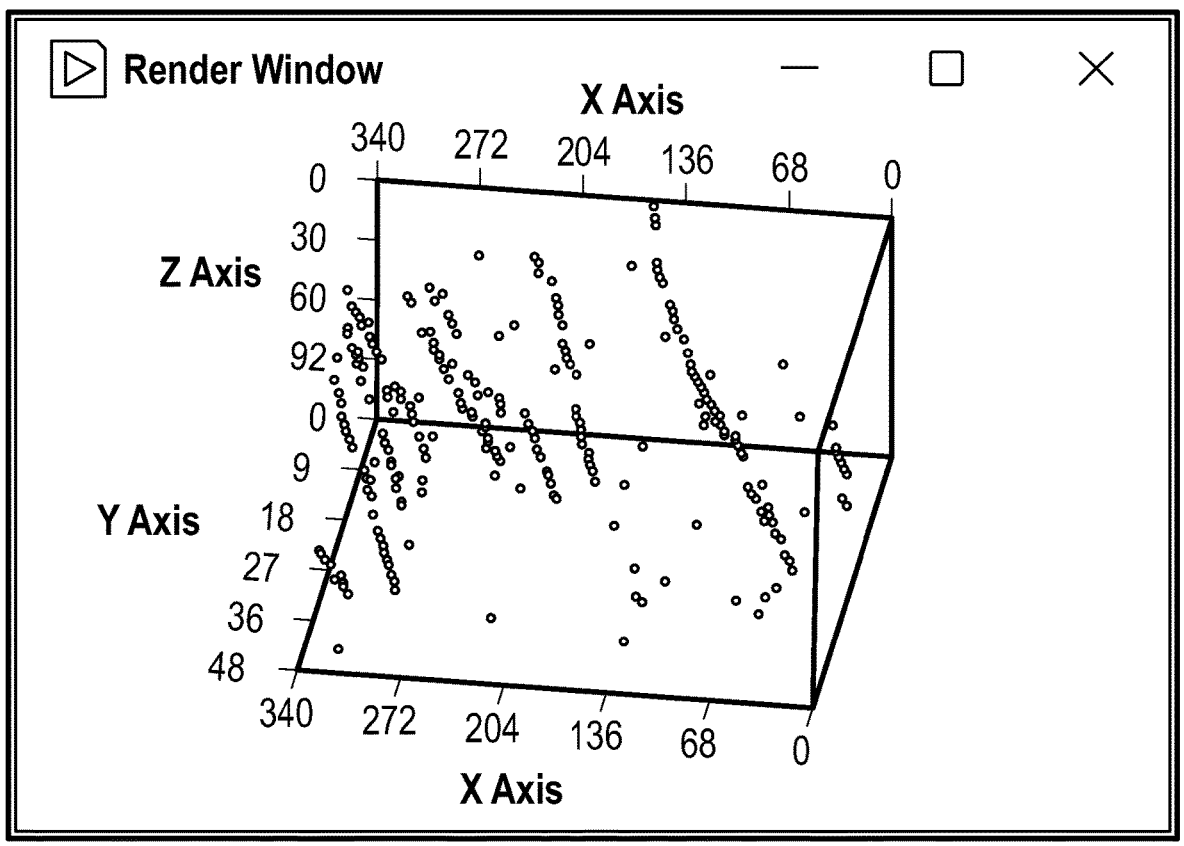
FIG. 7 illustrates angular tracks produced by alpha particles.

FIG. 3 illustrates a cloud of flipped cells in a selected sub volume of 3D NAND flash memory 930 (e.g., 240 by 120 by 64 cells) including both alpha particle radiation-induced flips and readout noise. FIG. 4 illustrates ion-induced tracks in the small sub volume of 3D NAND flash memory 930 (e.g., 240 by 120 by 64 cells) after processing using a clustering and shape processing algorithm as described in greater detail below. FIG. 5 illustrates tracks visualization after stitching colinear tracks belonging to the same irradiation event. It was also demonstrated that 3D NAND can be used for detection of gamma photons forming so-called delta electron tracks. These tracks do not form a straight line of flipped cells, like recoil proton or alpha tracks, but often are having more curved or globular shape. Deep learning approach using trained neural network classification algorithm is utilized to discriminate between neutron and photon induced tracks. FIG. 6 illustrates 3D NAND flash memory 930 small sub-volume that was not irradiated either by neutrons or gamma photons. After processing using a clustering and shape processing algorithm it shows only single cell flips related to readout noise. FIG. 7 illustrates angular tracks produced by alpha particles.

Embodiments of the disclosure may provide a portable wireless passive integrating neutron and photon sensor and dosimeter capable of dose accumulation without the need for battery power during radiation exposure and capable of performing the readout using battery power on demand or at predetermined time intervals. Embodiments of the disclosure may use a 3D volume of a NAND memory chip to detect radiation induced tracks and discriminate them from random readout noise using density-based clustering algorithms including collinearity of clusters forming the track and their shape parameter.

The 3D NAND flash memory for volumetric track detection may be coated with neutron converters. Initially, the 3D NAND flash memory cells may be programed to a most stable charge state. A most effective (i.e., optimized) threshold voltage, Vth may be selected to obtain optimal density of readout noise and radiation-induced flips in a 3D sub-volume for future data processing. Logical cell addressing (e.g., bitline, wordline, block number, etc.) may be converted into physical 3D cell coordinates. Mathematical algorithms for 3D image processing for track identification and counting may be applied. Wireless transmission of a limited amount of 3D cell addresses and data processing on the web cloud may be performed for example.

A 3D track-based approach to measure neutron dose may have many advantages in comparison with 2D sensors. Neutrons do not produce ionization themselves and may require converters to generate ionizing particles. Neutron detection techniques, consistent with embodiments of the disclosure, may be based on identification of linear-shaped tracks produced, for example, by recoil protons resulting from neutron interaction with the converter material (e.g., polyethylene containing high concentration of hydrogen atoms (protons)). Fast neutrons may have the highest interaction cross-section with hydrogen (proton) containing materials, because the masses of neutron and proton are almost identical, and neutrons may transfer up to 100% of their kinetic energy to protons and knock them out from the converter.

Recoil protons in turn may produce ionization in the sensor material and may be detected. In case of thermal and epithermal neutrons, one way to convert neutrons into ionizing particle may be to use $^6$Li- or $^{10}$B-containing materials, because both isotopes have high capture cross-section for low energy neutrons and, as the result of nuclear reaction, may produce alpha particles and/or tritium ions. In other words, with respect to the converter, polyethylene, $^6$Li-containing glass, $^{10}$B-containg glass or plastic may be used for detection of respectively fast and epithermal/thermal neutrons while Polytetrafluoroethylene (PTFE) plastic, containing no hydrogen, may be used for gamma photon events discrimination.

2D detectors have difficulty to distinguish in-cell events caused by charged particles from random readout noise as illustrated by FIG. 1. In contrast, heavy charge particles or even delta electrons generated by gamma photons penetrating 3D detector may produce linear or curved tracks and may be distinguished from individual cell events caused by readout noise as illustrated by FIG. 2. Mathematical 3D image processing using density-based clustering algorithm, shape parameter discrimination, and combining smaller clusters located on the same straight line may separate the radiation-induced tracks from readout noise.

Figure 8:
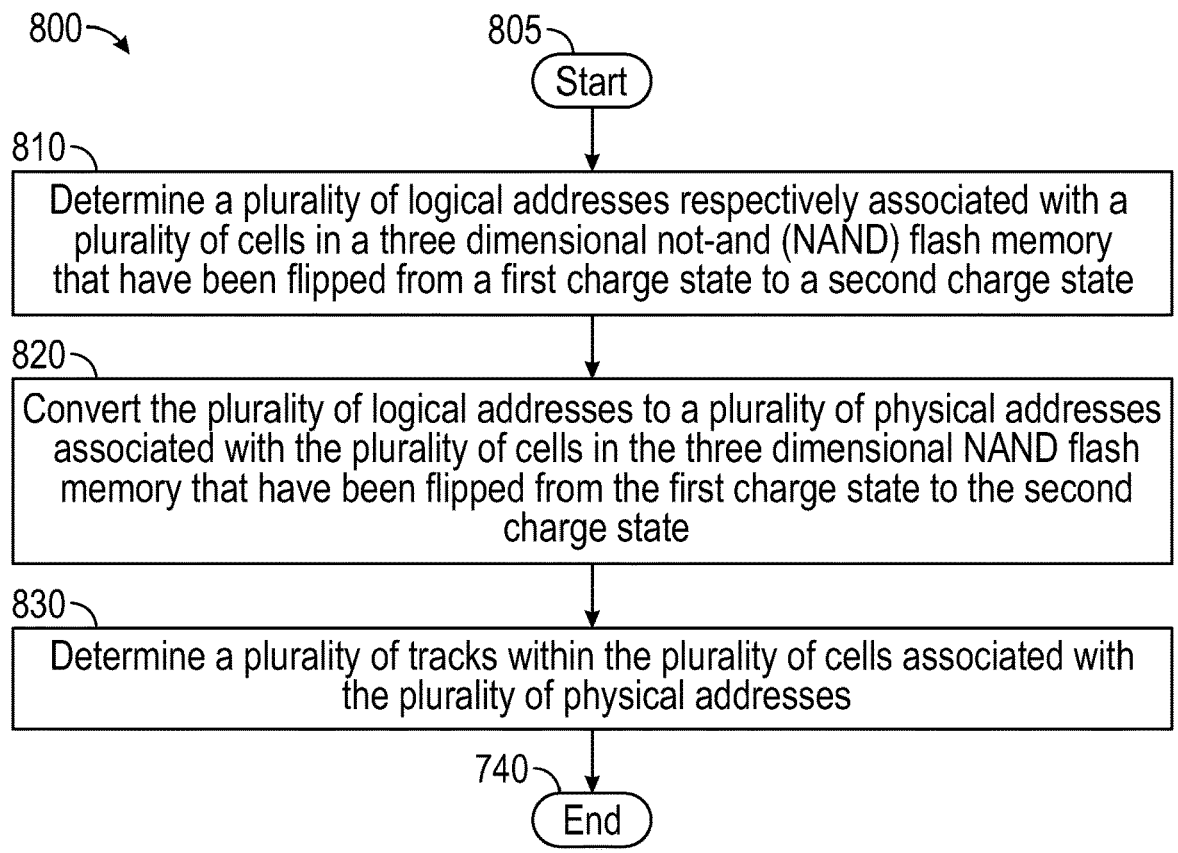
FIG. 8 is a flow chart of a method for providing dose information from digital neutron dosimeter based on 3D NAND flash memory.

FIG. 8 is a flow chart setting forth the general stages involved in a method 800 consistent with embodiments of the disclosure for providing a digital neutron or photon dosimeter based on 3D NAND flash memory. Method 800 may be implemented using a computing device 900, 3D NAND flash memory 930, and a flash control device 935 as described in more detail below with respect to FIG. 9. Ways to implement the stages of method 800 will be described in greater detail below.

Method 800 may begin at starting block 805 and proceed to stage 810 where flash control device 935 may readout flash memory specified locations of the flash die to determine a plurality of logical addresses respectively associated with a plurality of cells in 3D NAND flash memory 930 that have been flipped from a first charge state to a second charge state. For example, 3D NAND flash memory 930 may be covered with the converter. When a neutron impinges the converter, a proton may be knockout from the converter. The knockout proton may pass through 3D NAND flash memory 930 causing a track of cells to be flipped from the first charge state, that the cells were initially programmed at, to a second charge state. The first charged state may be higher than the second charged state.

Radiation-induced events in memory cells may indicate themselves by the loss of charge stored on a floating gate of a MOSFET transistor and may be identified by selecting an appropriate threshold voltage applied to a control gate during the readout process of the memory. As stated above, 3D NAND flash memory 930 may comprise, but is not limited to, a TLC memory that may be programmed to eight different charge states. Radiation may discharge the floating gate at the selected threshold voltage Vth, thus impended cells appear in a lower charge state (i.e., the second charged state). Readout Vth may be selected to obtain the optimal cell cloud density in a 3D sub-volume suitable for density-based clustering.

From stage 810, where flash control device 935 determined the plurality of logical addresses respectively associated with the plurality of cells in 3D NAND flash memory 930 that have been flipped from the first charge state to the second charge state, method 800 may advance to stage 820 where computing device 900 or control device 935 may convert the plurality of logical addresses to a plurality of physical addresses associated with the plurality of cells in 3D NAND flash memory 930 that have been flipped from the first charge state to the second charge state. For example, to properly reconstruct and identify radiation-induced 3D tracks, a conversion from logical to physical addresses may be needed because data in 3D flash memories may be scrambled to eliminate electro-magnetic crosstalk between cells and to improve storage security.

Once computing device 900 or control device 935 converts the plurality of logical addresses to a plurality of physical addresses associated with the plurality of cells in 3D NAND flash memory 930 that have been flipped from the first charge state to the second charge state in stage 820, method 800 may continue to stage 830 where computing device 900 or control device 935 may determine a plurality of tracks within the plurality of cells associated with the plurality of physical addresses. For example, an optimal volume of memory for 3D image processing may be determined from estimation of an optimal number of radiation-induced flipped cells and readout noise for fast density-based clustering processing. For example, for one particular 3D NAND device this may be 240 by 240 cells in the lateral direction having each approximately 150 nm by 150 nm size and 92 layers having approximately 40 nm spacing in the vertical direction. As a result, this example sub-volume has dimensions of approximately 36 by 36 by 4 microns. Optimal density of flipped cells in the sub-volume was selected to be between 500 and 2000 flips (see FIG. 3).

3D clustering algorithm of processing, consistent with embodiments of the disclosure, may be used to discriminate radiation-induced cell flips from the background of cell flips associated with retention effects. Embodiments of the disclosure may provide: i) high efficiency for clusters of "standard" shapes (e.g., lines, semi-circles, etc.); ii) may not require a-priori knowledge of the expected number of clusters; and iii) may be stable to noise. Accordingly, embodiments of the disclosure may use a 3D Density-Based Spatial Clustering (3D-DBSCAN) for applications with noise, as a clustering process for example. The 3D-DBSCAN process is based on assumption that if a point belongs to a cluster, then it's located close to other points within the cluster and illustrated by FIG. 4. Other processes of clustering may be used (e.g., hierarchical clustering).

Small clusters located along the same straight line may be "stitched". The stitching of the clusters may rely on the fact that most of the radiation-induced clusters appear as linear tracks. Therefore, a vector may be associated with a track. A series of vector algebra operations may be performed on vectors associated with each track to establish the angle between the two vectors and the distance between the center of mass of each vector. The two sub-tracks may be considered collinear and form just one track if their vector angles and the distances are within the specified tolerances (see FIG. 5).

Clusters also may be selected using a shape parameter. The elongated linear shape of radiation-induced tracks may be a basis for the "shape parameter" that may effectively select only linear tracks. The shape parameter may be the gradient of the cluster points either along the cartesian axes or along the major eigenvector of the cluster. For example, only tracks with the shape parameter larger than a specified value may be retained. In contrast with memory chips irradiated with heavy charged particles or neutrons, memory chips irradiated with gamma photons may produce identifiable curved or globular tracks and may be discriminated using clustering density-based image processing and shape-filtering methods as well as trained convoluted neural network (CNN) classification algorithm. Once computing device 900 or control device 935 determines the plurality of tracks within the plurality of cells associated with the plurality of physical addresses in stage 840, method 800 may then end at stage 850.

Dose range of conventional track detectors may be limited to relatively low neutron doses because at high doses, tracks may start to overlap and image processing of individual tracks may be difficult. To expand the dose range, embodiments of the disclosure may use 3D Fast Fourier Transform (FFT) processing. Another approach for high dose measurements may be determining as a Total-Ionizing Dose (TID) process involving cumulative number of radiation-flipped cells in each sub-volume or the whole memory die.

Neutron energy range may be determined by the number and type of neutron converter that typically allow to detect neutrons from thermal energies of 0.025 eV to a high energy of 100 MeV. In case of flash-based devices the limitation may be on the high side of neutron energy range because recoil protons at high neutron energies may have low Linear Energy Transfer (LET) and small amounts of energy deposition in a memory cell.

Figure 9:
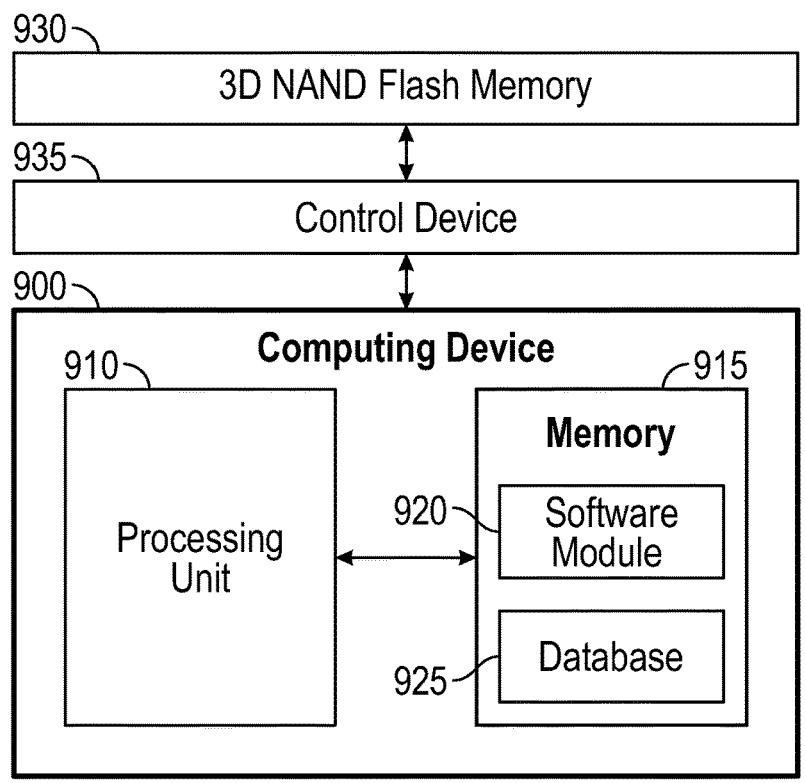
FIG. 9 is a block diagram of a dosimeter and a computing device.

FIG. 9 shows computing device 900. As shown in FIG. 9, computing device 900 may include a processing unit 910 and a memory unit 915. Memory unit 915 may include a software module 920 and a database 925. While executing on processing unit 910, software module 920 may perform, for example, processes for providing a processing method of digital neutron dosimeter based on 3D NAND flash memory as described above with respect to FIG. 8.

A digital neutron dosimeter, consistent with embodiments of the disclosure may include 3D NAND flash memory 930 (e.g., a flash memory chip packaged with neutron converters) and control device 935 (e.g., flash readout controller and a wireless radio). An additional low power microcontroller may be utilized to handle other dosimeter functions, like sleep mode, wake-up on demand or on predetermined time intervals, plus communication with other parts of the dosimeter dedicated to photon and motion detection.

Limited data processing may be performed on the dosimeter itself. For example, approximately $10^{-4}$ to $10^{-5}$ of the total number of readout cells may be readout by control device 935 and considered for streaming and processing by computing device 900. These readout cells may comprise the sum of cells representing readout noise and discharged radiation-induced cell flips. The conversion from logical addresses to physical address may be performed by the dosimeter or may be sent (e.g., streamed) to computing device 900 to perform the conversion. The aforementioned processing to determine tracks and the number of tracks may be performed by computing device 900.

The elements described above in FIG. 9 (e.g., computing device 900, 3D NAND flash memory 930, and control device 935) may be practiced in hardware and/or in software (including firmware, resident software, micro-code, etc.) or in any other circuits or systems. The elements described above in FIG. 9 may be practiced in electrical circuits comprising discrete electronic elements, packaged or integrated electronic chips containing logic gates, a circuit utilizing a microprocessor, or on a single chip containing electronic elements or microprocessors. Furthermore, the elements described above in FIG. 9 may also be practiced using other technologies capable of performing logical operations such as, for example, AND, OR, and NOT, including but not limited to, mechanical, optical, fluidic, and quantum technologies.

Figure 10:
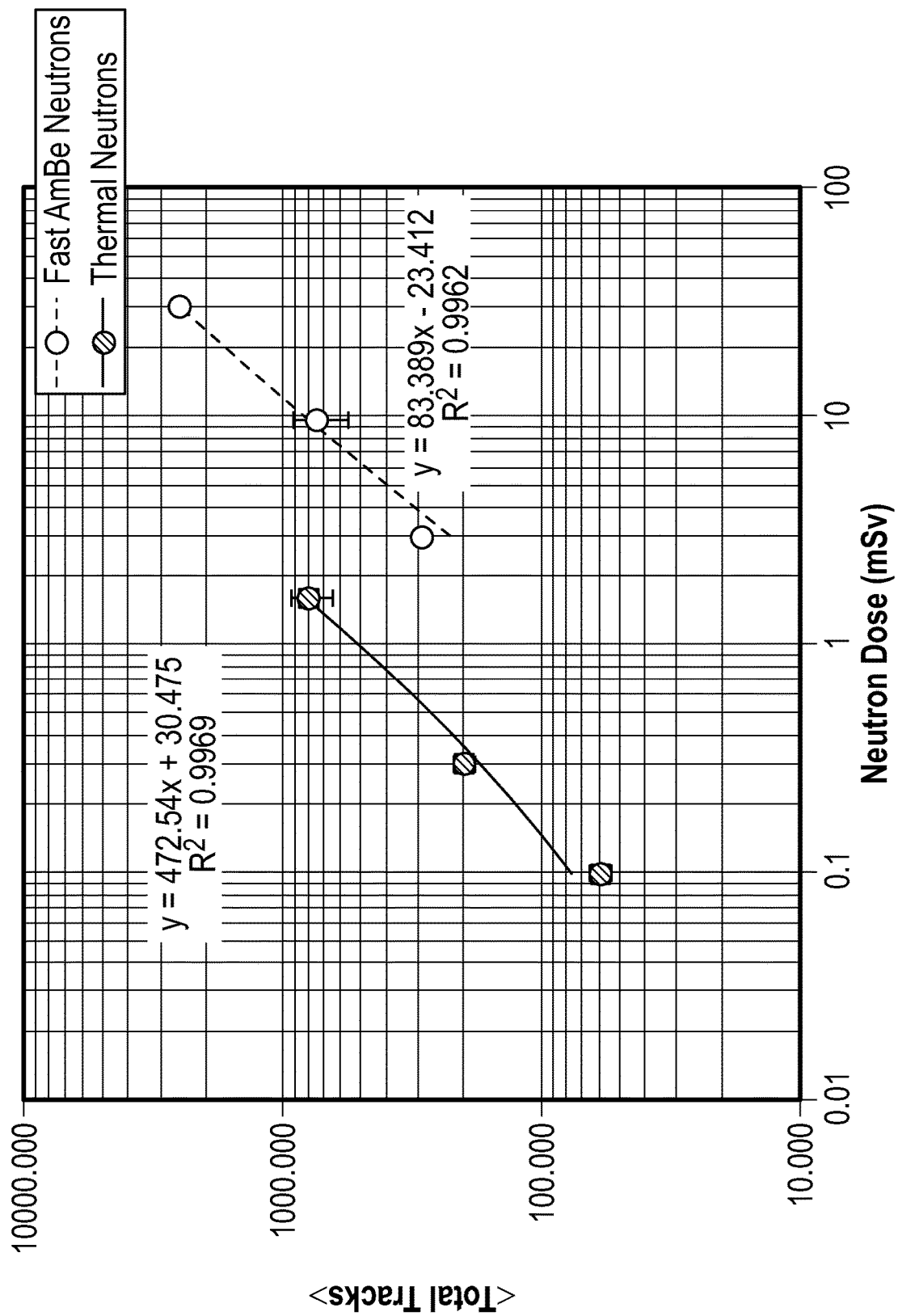
FIG. 10 illustrates experimental results of dose dependence of track numbers for fast AmBe neutrons and thermal neutrons.

As stated above, the radiation-induced tracks may be identified, discriminated, and counted on the background of readout noise. The number of tracks may be proportional to the dose accumulated by the dosimeter. FIG. 10 illustrates experimental results of dose dependence of track numbers for fast AmBe neutrons and thermal neutrons for example.

Embodiments of the disclosure may comprise a method of high-fidelity determination of an unknown neutron radiation dose that combines utilization of 3D NAND flash memory die covered by neutron converters, readout process with predetermined threshold voltages, converting logical to physical addresses, and mathematical algorithm of 3D sub-volume image processing for track identification and counting.

Embodiments of the disclosure may comprise a neutron converters comprising thin sheets/plates of polyethylene, and/or $^6$Li-containing glass, $^{10}$B-containing glass, or plastic, and/or polytetrafluoroethylene, the later one is intended for photon-induced signal subtraction.

Embodiments of the disclosure may comprise in addition to a 3D NAND memory chip, a memory controller, and a radio transmitter for data streaming to a base station or mobile device.

Embodiments of the disclosure may comprise wherein readout process utilizes one or more threshold voltages selected to obtain an optimal density of flipped cells in a selected sub volume of the memory die for fast and reliable density-based clustering processing to identify radiation induced tracks and discriminating these tracks from randomly distributed flipped cells, identified as noise.

Embodiments of the disclosure may comprise an initial factory-based dosimeter configuration and calibration, which includes erasing, programming and pre-irradiation readout of each flash chip and loading the firmware to the controller chip.

Embodiments of the disclosure may comprise the mathematical algorithm of 3D image and dose processing comprising: density based clustering of flipped cells in each selected sub-volume of the die, identifying cells belonging to the same track; cluster shape evaluation, identifying clusters of elongated shape; identifying and connecting clusters located close or on the same straight line assuming that these subclusters belong to the same track; and counting the total number of tracks and calculating the track density per unite area of the 3D NAND die that should be proportional to the neutron dose and inverse proportional to the calibration factor obtained during factory calibration.

Embodiments of the disclosure may comprise to increase the dynamic range of dose measurements and to avoid the saturation of the dosimeter because of high density of tracks and flipped cells the 3D image processing is performed using mathematical procedure based on Fast Furrier Transforms and Power Spectrum Integral calculation.

Embodiments of the disclosure may comprise non-destructive readout of irradiated dosimeter performed multiple times using predetermined parameters.

Embodiments of the disclosure may comprise, where the radiation dosimeters are irradiated with known radiation doses to perform device calibration and to determine the values of control parameters and calibration factors.

Embodiments of the disclosure may comprise a 3D NAND flash memory is based on floating gate cell technology.

Embodiments of the disclosure may comprise a 3D NAND flash memory is based on charge trapping cell technology.

Embodiments of the disclosure may comprise a wireless apparatus/device for high-fidelity determination of an unknown radiation dose that combines one or more 3D NAND flash chips/dies coated with one or more radiation converters, 3D NAND controller programmed for fast and optimal readout of NAND memory and a radio transmitter for streaming data.

Computing device 900 may be implemented using a low power Bluetooth access point, a tablet device, a mobile device, a smart phone, a remote control device, a personal computer, a network computer, a mainframe, a router, a switch, a server cluster, a smart TV-like device, a network storage device, a network relay device, or other similar microcomputer-based device. Computing device 900 may comprise any computer operating environment, such as hand-held devices, multiprocessor systems, microprocessor-based, minicomputers, mainframe computers, and the like. Computing device 900 may also be practiced in distributed computing environments where tasks are performed by remote processing devices. The aforementioned systems and devices are examples, and computing device 900 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD or DVD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, or a CD/DVD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general-purpose computer or in any other circuits or systems.

Embodiments of the disclosure may be practiced via a system-on-a-chip (SOC) where each or many of the element illustrated in FIG. 9 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 900 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   determining a plurality of logical addresses respectively associated with a plurality of flipped cells in a three-dimensional Not-And (3D NAND) flash memory that have been flipped from a first charge state to a second charge state;
   converting the plurality of logical addresses to a plurality of physical addresses associated with the plurality of flipped cells; and
   determining a plurality of tracks within a three-dimensional volume of flipped cells associated with the plurality of physical addresses, wherein the plurality of tracks are caused by neutron, beta, or photon radiation, and each track includes two or more flipped cells associated with a three-dimensional path of the neutron, beta, or photon radiation in the 3D NAND flash memory.

2. The method of claim 1, further comprising providing a value associated with the plurality of tracks.

3. The method of claim 1, wherein determining the plurality of tracks within the plurality of flipped cells comprises using density-based clustering to identify clusters of flipped cells and determining the plurality of tracks based on a shape and proximity of the clusters.

4. The method of claim 1, further comprising providing a converter on an exterior of the 3D NAND flash memory-die.

5. The method of claim 4, wherein the converter comprises at least one of polyethylene, $^6$Li-containing glass, $^{10}$B-containing glass or plastic, or polytetrafluoroethylene.

6. The method of claim 1, wherein determining the plurality of tracks comprises utilizing one or more threshold voltages to obtain an optimal density of cells that have been flipped to the second charge state.

7. The method of claim 1, wherein determining the plurality of tracks includes identifying flipped cells within the plurality of flipped cells that appear aligned within the 3D NAND flash memory.

8. The method of claim 1, wherein determining the plurality of tracks includes identifying flipped cells within the plurality of flipped cells that form a cluster having a shape parameter indicative of a track.

9. The method of claim 1, further comprising placing cells of the 3D NAND flash memory in the first charge state prior to determining the plurality of logical addresses respectively associated with the plurality of flipped cells in the 3D NAND flash memory.

10. A system comprising:
a memory storage; and
a processing unit coupled to the memory storage, wherein the processing unit is operative to:
  determine a plurality of logical addresses respectively associated with a plurality of flipped cells in a 3D NAND flash memory that have been flipped from a first charge state to a second charge state;
  convert the plurality of logical addresses to a plurality of physical addresses associated with the plurality of flipped cells; and
  identify radiation-induced tracks within a three-dimensional volume of flipped cells associated with the plurality of physical addresses, wherein each radiation-induced track includes two or more flipped cells associated with a three-dimensional path of radiation in the 3D NAND flash memory.

11. The system of claim 10, wherein the processing unit is further operative to transmit the plurality of physical addresses.

12. The system of claim 10, wherein the 3D NAND flash memory comprises a converter on an exterior of the three-dimensional NAND flash memory-die.

13. The system of claim 12, wherein the converter comprises at least one of polyethylene, $^6$Li-containing glass, $^{10}$B-containing glass or plastic, or polytetrafluoroethylene.

14. The system of claim 10, wherein the plurality of flipped cells comprises floating gate transistor cells.

15. The system of claim 10, wherein the plurality of flipped cells comprises charge trapping cells.

16. A non-transitory computer-readable medium that stores a set of instructions which, when executed, causes processing circuitry to perform actions comprising:
  determining a plurality of logical addresses respectively associated with a plurality of flipped cells in a 3D NAND flash memory that have been flipped from a first charge state to a second charge state;
  converting the plurality of logical addresses to a plurality of physical addresses associated with the plurality of flipped cells; and
  transmitting the plurality of physical address to a computing device configured to identify and count tracks of flipped cells associated with the plurality of physical addresses, each track including two or more flipped cells associated with a three-dimensional path of radiation in the 3D NAND flash memory.

17. The non-transitory computer-readable medium of claim 16, wherein the 3D NAND flash memory comprises a converter on an exterior of the 3D NAND flash memory.

18. The non-transitory computer-readable medium of claim 17, wherein the converter comprises at least one of polyethylene, $^6$Li-containing glass, $^{10}$B-containing glass or plastic, or polytetrafluoroethylene.

19. The non-transitory computer-readable medium of claim 16, wherein transmitting the plurality of physical addresses comprises wirelessly transmitting the plurality of physical addresses to a computing device remote from the processing circuitry.

20. The method of claim 1, further comprising wirelessly transmitting the plurality of physical addresses to a remote computing device configured to identify and count the plurality of tracks within the three-dimensional volume of flipped cells.

* * * * *